Nov. 3, 1942.   A. P. FOTHERGILL   2,300,494
APPARATUS FOR THE EXTRACTION OF JUICE FROM CITRUS FRUITS
Filed Nov. 14, 1939   3 Sheets-Sheet 1
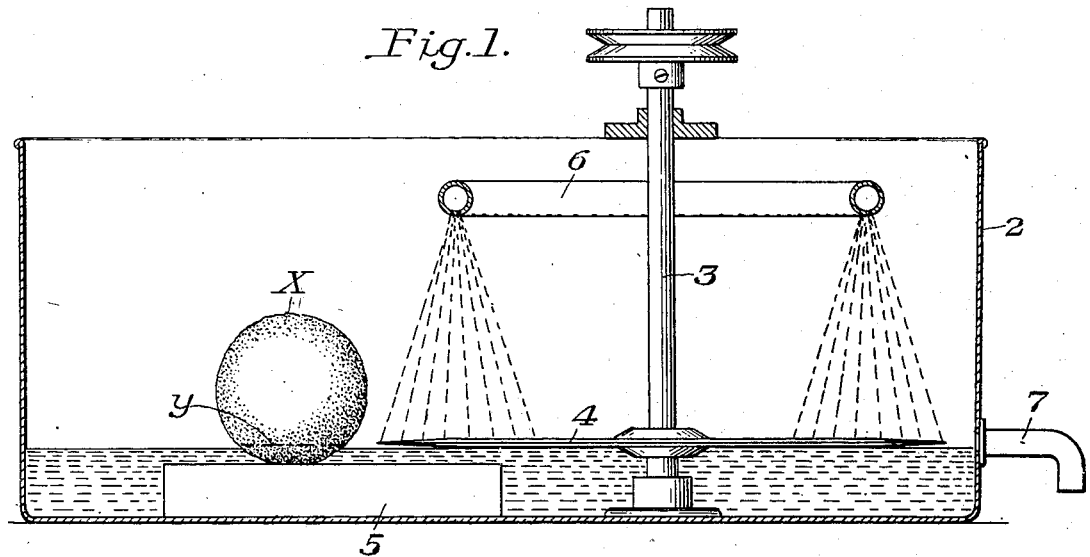
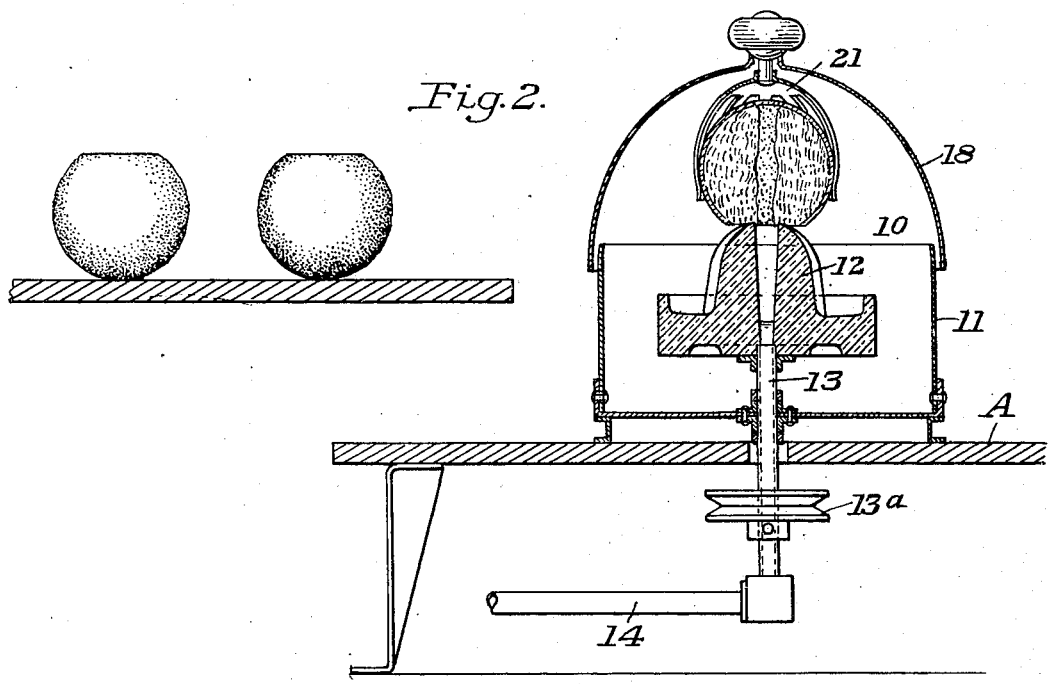
INVENTOR
Alex P. Fothergill
by his attorneys Nov. 3, 1942.  A. P. FOTHERGILL  2,300,494
APPARATUS FOR THE EXTRACTION OF JUICE FROM CITRUS FRUITS
Filed Nov. 14, 1939  3 Sheets-Sheet 2
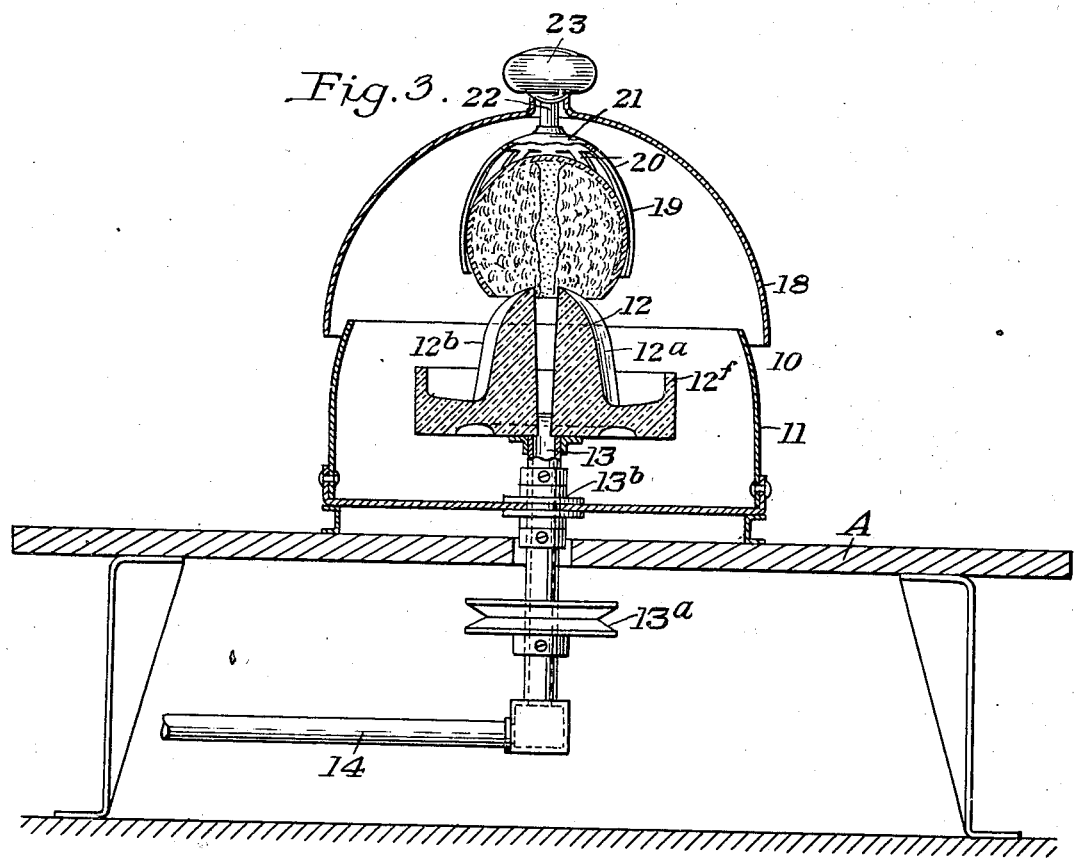
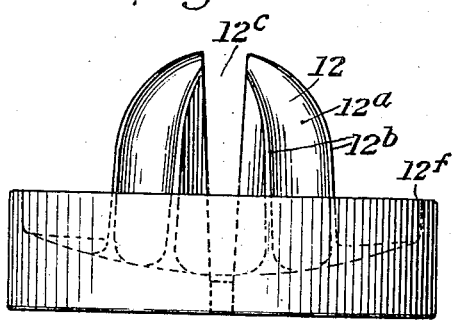
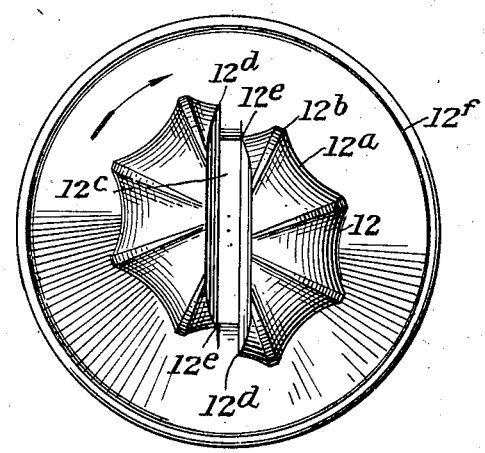
INVENTOR
Alex P. Fothergill
by his attorneys Nov. 3, 1942.  A. P. FOTHERGILL  2,300,494
APPARATUS FOR THE EXTRACTION OF JUICE FROM CITRUS FRUITS
Filed Nov. 14, 1939   3 Sheets-Sheet 3
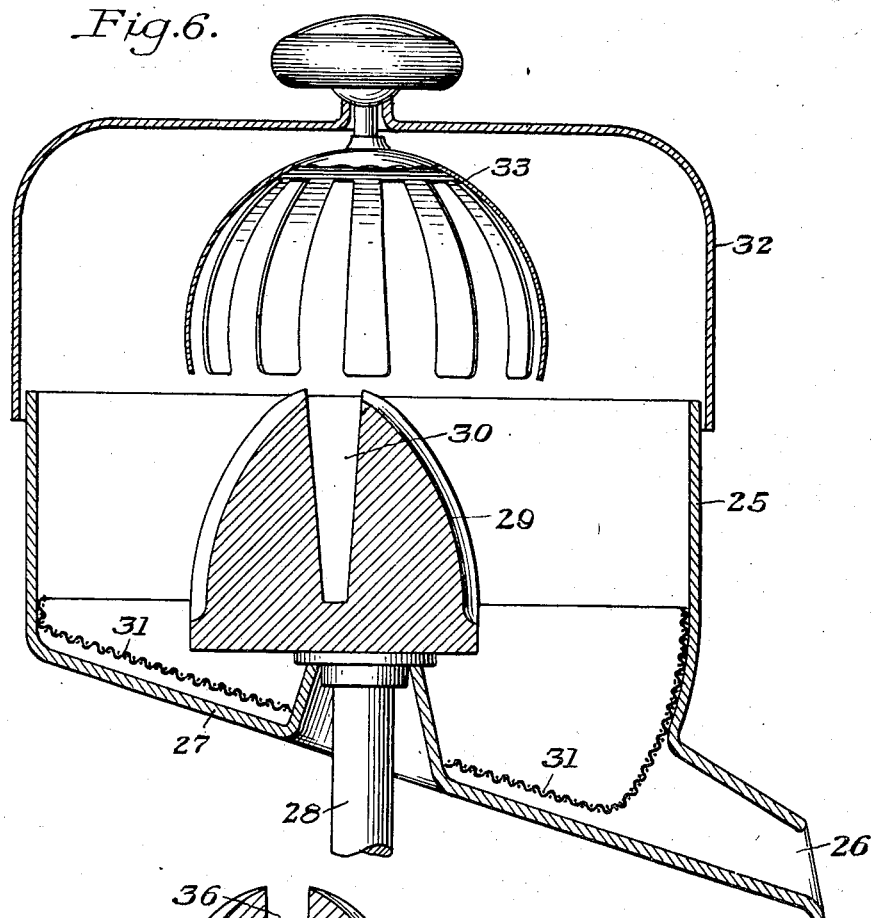
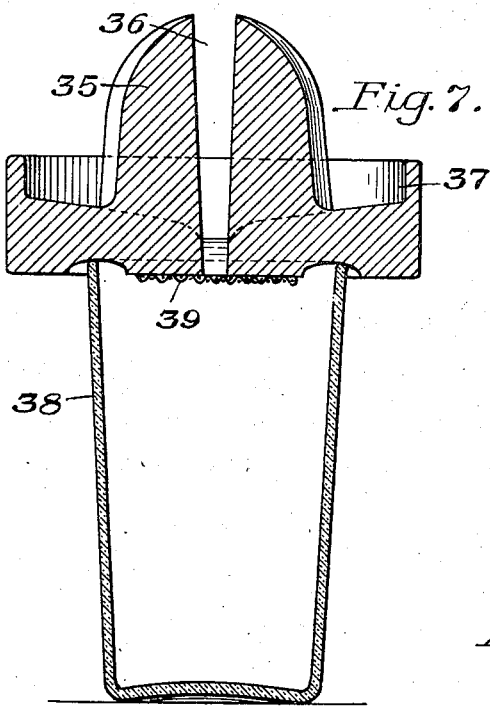
INVENTOR
Alex P. Fothergill Patented Nov. 3, 1942

2,300,494

UNITED STATES PATENT OFFICE 2,300,494

APPARATUS FOR THE EXTRACTION OF JUICE FROM CITRUS FRUITS

Alexander P. Fothergill, Orlando, Fla., assignor to Fogar, Inc., a corporation of Florida Application November 14, 1939, Serial No. 304,358

7 Claims. (Cl. 146—3)

This invention pertains to apparatus for extracting juice from citrus fruits whereby a superior product is obtained and wherein the extraction of the juice is more effectively accomplished.

In the extraction of juice from citrus fruits, a common procedure is to cut the fruits and then ream the cut pieces to extract the juice therefrom. The skins or rinds of citrus fruits contain considerable oils and terpenes which are picked up by the knife as it cuts into the rind and are spread over the interior of the fruit. I have found that the presence of these oils and terpenes even in relatively small quantities is detrimental to the product. The present apparatus is designed to reduce the amount of these substances in the juice to a minimum. In extracting the juice from the pulp it is common practice to press the cut fruit against a rotating reamer. This is usually done in the ambient air which accelerates the oxidation of certain organic compounds in the juice and accelerates the discoloration of the juice and may otherwise be detrimental to the product or to the cleanliness of the product. The present invention further provides an arrangement wherein the juice may be extracted in a confined space, and it also provides a reamer which effectively extracts the juice with less likelihood of contaminating the juice with oils or compounds in the rind or in the white pulp inside the rind. Because of the improvement in the construction of the reamer, it not only more effectively reams the juice, but it operates with less power.

My invention may be readily understood by reference to the accompanying drawings in which Figure 1 is a schematic view representing one form of device for cutting the fruit, the view representing a vertical section through the apparatus;

Figure 2 is a more or less schematic view illustrating the step of reaming the fruit;

Figure 3 is a transverse vertical section through a fruit reamer embodying my invention;

Figure 4 is a side elevation on a larger scale of the reamer head;

Figure 5 is a top plan view of the reamer head;

Figure 6 is a view similar to Figure 3 of a modified form of reamer; and

Figure 7 illustrates my invention applied to a hand reamer.

In practicing my invention the selected fruit is carefully washed after which the stem end is cut off to expose the interior of the fruit. The cutting is performed by a knife which is continuously washed by or immersed in water. This is more or less schematically illustrated in Figure 1 in which 2 designates a tank having a spindle 3 therein driven from any suitable source of power and which carries a disk knife or cutter 4. 5 designates a support within the tank on which a fruit designited X may be set while it is pushed against the edge of the revolving knife 4. The knife removes the end of the fruit at a distance preferably about ¼" back from the stem end, the plane of the cut being indicated in dotted lines at y in Figure 1. Positioned over the knife so as to continuously spray water thereon is an annular pipe 6 having a plurality of openings therein for directing jets of water onto the surface of the knife thus continuously washing it and wetting it. The tank may be provided with an overflow pipe 7 and this overflow pipe may be located at a level where the bottom surface of the knife 4 is always immersed in the water. The pipe 7 may of course be at a higher elevation in which case it would be unnecessary to employ the circular nozzle 6 and water would merely be discharged into the tank from any suitable source and the cutter 4 would be completely immersed.

The importance of wetting the knife is to carry away the oils and terpenes which are exuded from the rind of the citrus fruit and which, if they were not constantly carried away, would be wiped or smeared across the exposed pulp on the interior of the fruit and thus contaminate the juice extracted therefrom.

After the fruits have been cut, they are transferred to a reaming station, preferably in such manner that the rind of one fruit will not contact the open end of another fruit. As indicated in Figure 2, the fruits from which the ends have been removed are set upright so that the rind of one does not rub against the cut surface of another. At the reaming station the fruits are engaged by a rotary reamer which extracts the juice from the interior thereof but which does not mutilate the rind or dig into the white more or less bitter lining on the interior of the peel. The reamer is preferably of a character in which a fruit is reamed while it is closed against the free circulation of air. The construction of the reamer will be more particularly described in connection with Figure 3 and the subsequent figures. In Figure 2 the reamer is designated generally as 10 and comprises a fixed casing or bowl 11 within which is a reaming head 12 carried on a hollow spindle 13, the reaming head being of such construction that the juice as it is extracted from the fruit passes down the bifurcated interior of the reamer head and discharges through the hollow spindle into a fixed pipe 14.

The apparatus 10 which has heretofore been briefly described in connection with Figure 2 for extracting the juice is more fully illustrated in Figures 3 and 4. As shown in Figures 3, 4 and 5, the extractor 10 has a supporting structure A on which the fixed bowl 11 is secured. The spindle 13 passes through the bottom of the bowl 11 and it may be driven through any suitable source, a driving pulley 13a being shown thereon for this purpose. Where the spindle passes through the bottom of the bowl there is a bearing for the spindle as indicated at 13b.

The reaming head or burr 12 is generally in the form of an inverted conical body, the surface of the body being fluted, there being generally concave grooves 12a between the ribs 12b. The conical body is bifurcated across the diameter thereof providing an open space or slot 12c across the body. The slot or space 12c is preferably of downwardly decreasing width so that the slot is narrower at the bottom than at the top. This slot is of importance first in that as the fruit is pushed down over the reamer, the central core of the fruit will be accommodated in this slot or groove. Secondly, the tapered sides of the grooves act as a strainer to prevent the seeds and rag or fibrous part of the fruit from passing down through the slot. Third, the ribs 12b of the fluted surface of the reamer terminate at this slot in a relatively sharp edge, the edges of the ribs and the edges of the slot where they intersect providing cutting edges which facilitate the reaming out of the fruit and at the same time these cutting edges are so disposed that they do not tend to dig into the peel or rind of the fruit. A further advantage of the slotted body is that depending upon the direction of rotation of the reamer, two edges of the slot may project beyond two other edges so as to form a more effective reamer. By further reference to Figure 5, the reamer is designed to rotate in a clockwise direction as indicated by the arrow, and the portion 12d projects beyond the portion 12e. In other words, the two edges of the bifurcation facing a clockwise movement of fruit are offset by reducing the diameter of the opposite sides thereby forming a two-lipped reamer which is more effective for extracting the juice. In the arrangement shown in Figures 3 to 5 inclusive, the juice is intended to be discharged through the hollow spindle 13, this spindle opening into the base of the slot in the burr or reamer. In order to collect the juice that runs down the sides of the cone and direct it into this hollow spindle, the burr is surrounded by a lipped flange 12f that provides a trough around the base of the burr and this trough is preferably inclined so as to produce a flow of juice circumferentially of the burr to the two sides of the slot. The bowl 11 is preferably provided with a telescoping cover 18 in the center of which is a resilient fruit holder 19. The fruit holder comprises a series of resilient finger-like elements 20 projecting from the central body portion 21 and forming a fruit-receiving socket therein. The member 21 is attached to a pin 22 that passes through the center of the cover and which has a knob or handle 23 thereon to be grasped by the operator while the fruit is being reamed.

In use the operator inserts the cut fruit in the cup-like holder provided by the resilient springs 20 and then positions the cover in which the holder is mounted over the revolving cone and presses down. The fruit holder is preferably somewhat loosely mounted in the cover so that the fruit can readily adjust itself to the reamer. The cover of course serves to exclude the free air from the interior of the juice extractor. Moreover, the juice is clean and sanitary because the juice never comes in contact with the hands or person.

The modification shown in Figure 6 also employs a cover and a bifurcated reamer or burr. In this modification, however, the juice runs out a discharge spout on the bowl instead of through a hollow spindle. Also, the reamer has been illustrated as being slightly eccentric with respect to the shaft on which it is carried so that it revolves within a circumference the diameter of which is greater than its own diameter. In this modification 25 designates a bowl having a discharge pipe 26 and a bottom which is inclined, designated 27. A shaft 28 passes through the bottom. The reamer or burr 29 generally similar to the reamer 12 is mounted on the shaft or spindle 28. As previously mentioned, it may be slightly eccentric so that a smaller reamer may be used but which nevertheless will move in an orbit as large as that of a larger reamer rotating concentrically. The reamer is provided with a bifurcation 30 extending across the diameter thereof. In this arrangement the bifurcation does not go to the base of the burr and the juice instead of passing down the center of the burr is discharged at the sides of the bifurcation into the bowl. The side walls of the bifurcation nevertheless are sloped downwardly toward each other. In order to strain the juice, a screen 31 is shown inside the bowl. The cover arrangement of the fruit holder is substantially the same as that previously described, the cover being designated 32 and the fruit holder being designated 33.

While my bifurcated reamer or burr is especially useful where the burr is motor-driven and the fruit is held stationary, the burr may also be employed to advantage in a reamer where the burr is stationary and the fruit is rotated or in a hand reamer. This is illustrated in Figure 7 where the reamer comprises a conical body 35 of the general form described in connection with Figure 3. It is provided with a diametrically extending bifurcation 36 from the top thereof clear through to the base. Surrounding the body 35 at its base is a trough-forming portion 37, the trough-forming portion serving to receive the juice that runs down the outside of the conical body and direct it into the slot. The bottom of the trough is sloped from high points 90° removed from the ends of the slot to low points at the ends of the slot so that the juice all flows into the slot. The body is provided with a recess on the under face thereof to fit over the top or lip of a container 38. All of the juice runs down through the slot and into the container 38 which is separate from the reamer. In this figure the reamer is illustrated also as having a screen over the bottom of the slot to further strain the juice. This screen may be employed with any of the previously described modifications. This screen is designated 39 in Figure 7.

Whether the reamer is hand-operated or is mechanically driven, it is designed to remove the juice without contact with the rind or without rupturing the oil cells of the rind and is designed to otherwise extract the juice with a minimum likelihood of inclusion of undesirable substances from the skin.

While I have specifically illustrated and described certain embodiments of my invention and certain apparatus for carrying out the process, it will be understood that the invention is not confined to the particular construction of the apparatus shown and various changes and modifications may be made within the contemplation of my invention and under the scope of the following claims.

I claim:

1. Apparatus for extracting juice from citrus fruits comprising a reaming burr of generally cone shaped form having a fluted exterior surface and having a slot extending therethrough on a diameter thereof from the apex of the cone toward the base, the side walls of the slot converging inwardly toward the bottom of the slot, the reamer being so shaped that two diagonally positioned edges are radially offset from the edges which are directly opposite them to provide cutting lips.

2. A reamer for a citrus fruit extracting device comprising a generally cone shaped body which is bifurcated on the diameter thereof from the apex toward the base, the sides of the bifurcation being tapered from the apex toward the base, the opening formed by the bifurcation continuing through the base of the body and providing a narrow juice discharge slot, and means around the base of the body forming a trough, said trough having its bottom shaped to direct the juice that flows into it into said slot.

3. A reamer for extracting juice from citrus fruits comprising a generally cone shaped body having reaming grooves formed on the exterior thereof, said body being bifurcated from the apex toward the base thereof with the sides of the bifurcation being tapered downwardly from the apex toward the base whereby there is a narrow slot through the base for the discharge of the juice therethrough, and means around the body at the base thereof forming an annular trough, the bottom of the trough being sloped to direct the flow of juice into the slot.

4. A reamer for extracting juice from citrus fruits consisting in a cone having a rounded apex, a fluted exterior surface and a slot extending through the cone along a diameter from the apex of the cone toward the base.

5. A reamer for extracting juice from citrus fruits consisting in a cone having a rounded apex, a fluted exterior surface and a slot extending through the cone along a diameter from the apex of the cone toward the base, the side walls of the slot converging inwardly toward the bottom of the slot.

6. A fruit juice extractor comprising a reamer, a bowl in which the reamer is enclosed, a telescoping cover for the bowl, and a fruit holder within the cover facing the reamer and in axial alignment therewith, whereby fruit to be treated may be pressed against the reamer.

7. A fruit juice extractor comprising a reamer, a bowl in which the reamer is enclosed, a telescoping cover for the bowl, and a fruit holder within the cover facing the reamer and in axial alignment therewith, whereby fruit to be treated may be pressed against the reamer.

ALEXANDER P. FOTHERGILL.